(12) United States Patent
Kiani et al.

(10) Patent No.: US 11,961,101 B2
(45) Date of Patent: Apr. 16, 2024

(54) SYSTEM AND METHOD FOR OFFERING NETWORK SLICE AS A SERVICE

(71) Applicant: AT&T Intellectual Property I, L.P., Atlanta, GA (US)

(72) Inventors: Abbas Kiani, Aberdeen, NJ (US); Seyed Hashemi, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/187,450

(22) Filed: Mar. 21, 2023

(65) Prior Publication Data

US 2023/0230117 A1 Jul. 20, 2023

Related U.S. Application Data

(62) Division of application No. 16/802,342, filed on Feb. 26, 2020, now Pat. No. 11,636,503.

(51) Int. Cl.
| | |
|---|---|
| *G06Q 30/00* | (2023.01) |
| *G06N 20/00* | (2019.01) |
| *G06Q 30/0201* | (2023.01) |
| *G06Q 30/08* | (2012.01) |
| *H04L 12/00* | (2006.01) |
| *H04L 12/46* | (2006.01) |
| *H04L 41/00* | (2022.01) |
| *H04L 41/12* | (2022.01) |

(52) U.S. Cl.
CPC ......... *G06Q 30/0206* (2013.01); *G06N 20/00* (2019.01); *G06Q 30/08* (2013.01); *H04L 12/4641* (2013.01); *H04L 41/12* (2013.01)

(58) Field of Classification Search
CPC .... G06Q 10/00; G06Q 50/00; H04L 12/4641; H04L 41/12; G06N 20/00
USPC ........................................................ 705/7.35
See application file for complete search history.

(56) References Cited

U.S. PATENT DOCUMENTS

| | | | |
|---|---|---|---|
| 2011/0276447 A1 | 11/2011 | Paul et al. | |
| 2017/0039633 A1* | 2/2017 | Yenisetty | ........... G06Q 30/0275 |
| 2017/0180213 A1 | 6/2017 | Li et al. | |
| 2018/0220008 A1* | 8/2018 | Reith | ..................... H04L 47/821 |
| 2018/0220358 A1* | 8/2018 | Reith | ..................... H04W 48/02 |
| 2020/0106680 A1 | 4/2020 | Chen et al. | |
| 2020/0195495 A1 | 6/2020 | Parker et al. | |
| 2020/0257566 A1 | 8/2020 | Ganguli et al. | |
| 2020/0260218 A1 | 8/2020 | Karimli et al. | |
| 2021/0112428 A1 | 4/2021 | Young et al. | |
| 2021/0360401 A1 | 11/2021 | Marinho et al. | |
| 2021/0392501 A1* | 12/2021 | Buyukdura | ............. H04L 67/10 |
| 2021/0392572 A1* | 12/2021 | Thantharate | .......... H04W 48/16 |
| 2023/0217362 A1* | 7/2023 | Sharma | ................. H04W 24/02 |
| | | | 370/329 |

* cited by examiner

*Primary Examiner* — Mustafa Iqbal
(74) *Attorney, Agent, or Firm* — Guntin & Gast, PLC; Matthew Tropper

(57) ABSTRACT

A method includes defining a first specification for a first network slice, determining a first equilibrium value for a first time period for the first network slice offering, receiving a first bid price for the first network slice for the first time period from a first customer, comparing the first equilibrium value to the first bid price; and providing services using the network slice to the customer during the time period in accordance with the first specification and the bid price if the bid price meets or exceeds the equilibrium value.

20 Claims, 8 Drawing Sheets

SYSTEM AND METHOD FOR OFFERING NETWORK SLICE AS A SERVICE

CROSS REFERENCE TO RELATED APPLICATION(S)

This application is a divisional of U.S. patent application Ser. No. 16/802,342, filed on Feb. 26, 2020. All sections of the aforementioned application(s) and/or patent(s) are incorporated herein by reference in their entirety.

TECHNICAL FIELD

This disclosure is directed to systems and methods for specifying network slice as a service offering.

BACKGROUND

In 5G networks, Network Slice as a Service (NSaaS) may be used for enterprises that require isolated radio resource allocation in on-premise deployments. In NSaaS, the enterprise customer, e.g., a factory or campus, has the control or ownership of its network slices including the radio resources. Using software defined networks by a network service provider goes a long way towards having the capability for enterprises to spin up the resources for each customer as they are needed.

However, this begs the question as to how and under what terms the network provider should make those resources available. Enterprise customers want ready access to network slice instances (NSIs) but typically would not want to pay for unused network capacity. Network providers need to be able to economically and efficiently provide NSIs and include the granularity of any particular NSI in its pricing models by taking into consideration its enterprise customers' location and availability of resources at different network domains, e.g., access, edge, and core. In fact, the traditional charging and policy capabilities are not suitable or flexible for the paradigm of NSaaS where NSIs must be offered in a sizable manner and with adjustable values.

SUMMARY

The present disclosure is directed to a method including defining a first specification for a first network slice, determining a first equilibrium value for a first time period for the first network slice, receiving a first bid price for the first network slice for the first time period from a first customer, comparing the first equilibrium value to the first bid price, and providing services using the network slice to the customer during the time period in accordance with the first specification and the bid price if the bid price meets or exceeds the equilibrium value. The first specification may include a network topology and performance requirements. The equilibrium value may be calculated based on the minimum cost to provide the service using the network slice or alternatively, the equilibrium value may be calculated based on a location that the network slice will be instantiated or may be based on market supply and demand in a particular location and for the first time period.

In an aspect, the method may further including determining a second equilibrium value for a second time period for the first network slice; receiving a second bid price for the second time period for the first network slice, comparing the second equilibrium value and the second bid price, and providing service using the network slice to the customer if the second bid price meets or exceeds the second equilibrium value. The first bid price may be calculated based on a historical price for the network slice for a similar time period. In an aspect, the first bid price may be calculated by a machine learning algorithm.

The disclosure is also directed to a method including defining a first specification for a first network slice, analyzing historical pricing for the first network slice, generating a first bid price for the first network slice for a first time period, and if the first bid price is accepted, receiving the service using the first network slice in accordance with the first specification. The first bid may be accepted if the first bid meets or exceeds an equilibrium value. The method may further include if the first bid is not accepted, then increasing the first bid to a second bid and receiving service using the network slice in accordance with the first specification if the second bid price is accepted. The analyzing step may include a machine learning algorithm to determine a target equilibrium value and the first bid price is set equal to or greater than the target equilibrium value.

The disclosure is also directed to a system including a software defined network (SDN) controller, a software defined network managed by the SDN controller and wherein the software defined network has a first virtual network function (VNF) topology, a second VNF topology and a third VNF topology and wherein each of the first VNF topology, the second VNF topology and the third VNF topology has a set of performance requirements associated therewith, an input-output interface, a processor coupled to the input-output interface wherein the processor is further coupled to a memory, the memory having stored thereon executable instructions that when executed by the processor cause the processor to effectuate operations including defining a network slice specification using at least one of the first VNF topology, the second VNF topology or the third VNF technology and the associated performance requirements, determining a first equilibrium value for a network slice configured in accordance with the network slice specification, receiving a first bid price for the network slice, comparing the first bid price to the equilibrium value and providing service using the network slice in accordance with the network slice specification based on the comparing step. The first VNF topology may include an access cloud architecture and includes an SDN radio receiving unit in communication with a base station, an SDN access evolved packet core (EPC), and a first transport layer between the SDN radio receiving unit and the SDN access EPC. The second VNF topology may include an edge cloud architecture and includes an edge SDN EPC and there is a second transport layer between the first VNF topology and the second VNF topology. The third VNF topology may include a core cloud architecture and includes a core SDN EPC and there is a third transport layer between the second VNF topology and the third VNF topology. The operations may further include determining a second equilibrium value for a second time period for the network slice, receiving a second bid price for the second time period for the first network slice, comparing the second equilibrium value and the second bid price, and providing the network slice to the customer if the second bid price meets or exceeds the second equilibrium value. The system may further include an historical database accessible by the customer and the first bid price is calculated using data from the historical database. The first bid price may be calculated using a machine learning algorithm in which the machine learning algorithm may include linear regression analysis.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
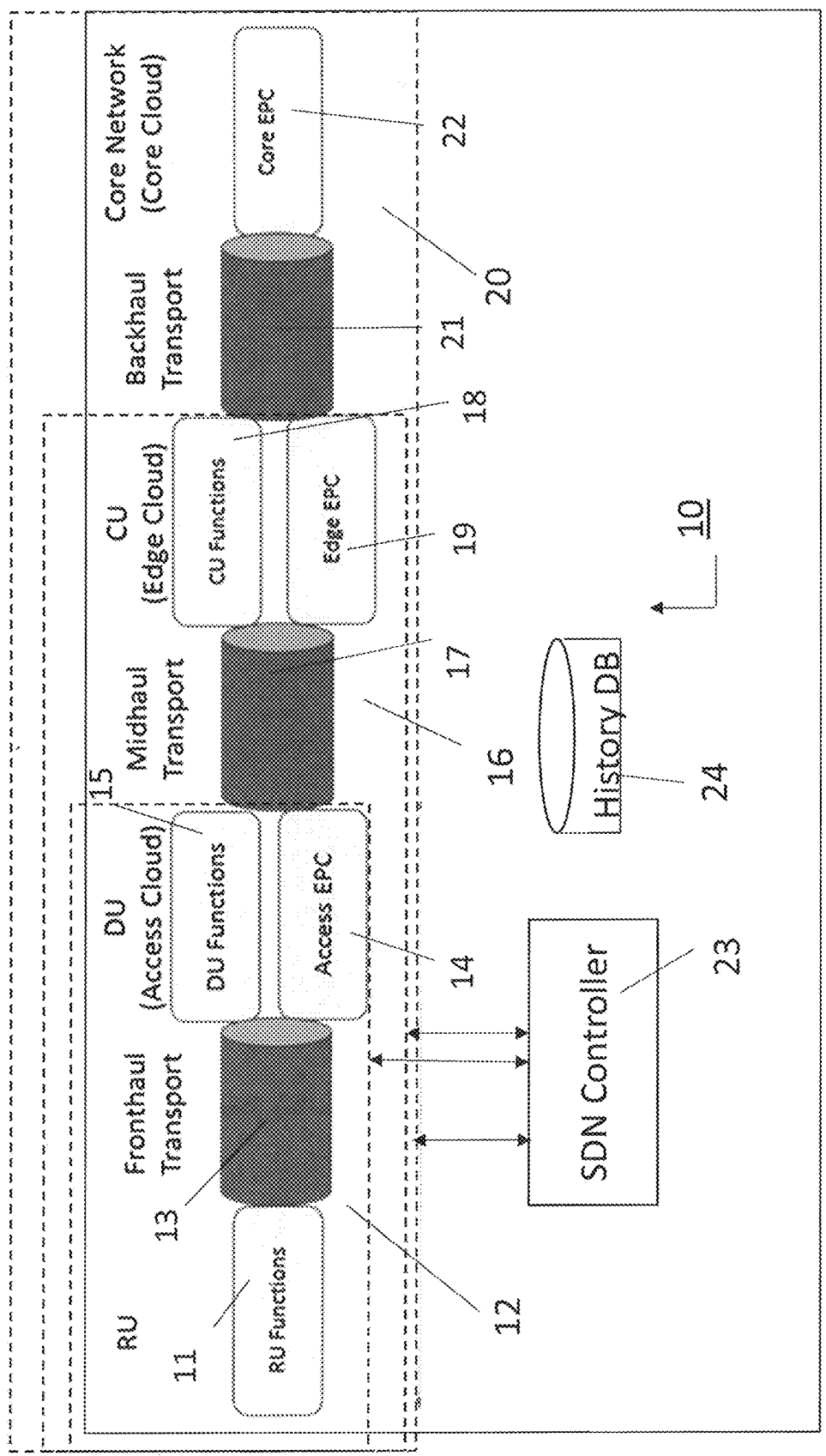
FIG. 1 illustrates an exemplary 5G system topology for implementing network slice as a service.

System Overview. This disclosure is directed to a novel system and method for a resource and topology aware NSI valuation approach to render NSIs to the customers. The disclosure includes a new model for service provider NSI specifications by providing a model that can be extended and implemented by service providers as a service catalog for network slice services. In conjunction with that model, the disclosure includes a time-slotted NSI valuation approach wherein the service provider is able to set and reset the economic value for each type of NSI for a particular time frame. In an example, the values may be set and reset at the beginning of a given time frame such as 15 minutes.

For the NSI specification, delivery and pricing models to operate efficiently, the disclosure provides processes on both the provider side and the customer side that may be implemented. For the purposes of this disclosure, unless otherwise specified, the term "provider" will mean a network service provider or a network service reseller that is offering NSaaS to its customers. The term "customer" will mean the purchasers of NSaaS by enterprise customers for its own consumption or that of its organization, cooperative customers purchasing and using NSaaS for its members, or network resellers who are purchasing and reselling NSaaS to its own customers.

Provider Side: On the network service provider side, the service provider may offer customers a set of NSIs. Such NSIs may be provisioned as different types of NSIs, each with a different KPI for the amount of expected or maximum traffic. For example, one type of NSI may have a specification which includes a maximum latency of "x" milliseconds for a maximum allowed traffic of "y" bits, while a second type of NSI may have a specification which includes a longer maximum latency of "2x" milliseconds but for a higher maximum allowed traffic of "2y" bits.

The various types of NSIs may also follow different topologies and different resource-based requirements. To manage the fluctuations in consumer demands while taking into consideration of the limitations of available resources, the service provider may consider a flexible NSI valuation method in which the resources are valued according to the demands. In such a case, the service provider may update the value for each type of NSI at the beginning of a time frame wherein the value depends on available resources and demands.

Customer Side: The NSI customers may submit their NSI requirements and demand bids for the offered NSIs stating their maximum willingness to pay for their desired NSI type. The maximum willingness to pay can be decided by consulting an NSI value history. In an aspect, customers may submit their bids at any time even if the service provider begins an auction at a predefined time interval. Demand bids may be submitted based on the required NSI type. At the time of the auction, bids above a certain threshold value are accepted and NSaaS is provided, while bids below the threshold are rejected and no NSaaS is provided.

Resource and Topology Aware Auction: The service provider may initiate an auction at predetermined time intervals. To do so, the service provider may decide the threshold value of the NSIs, which may depend on the number of served bids for each type of NSI. The service provider may also determine the assignments of the VNF among the various cloud locations based on demand or anticipated demand. This may result in a local valuation approach in which the value of a specific type of NSI varies from one location to another based on the available radio resources and traffic characteristics of supply and demand. In an aspect, all the served bids in one AP location may pay an identical value, e.g., equilibrium value per instance of an NSI type. In another aspect, for a given type of NSI at each AP location, only those bids whose respective willingness to pay are greater than or equal to the equilibrium value may be served with their desired NSIs.

This NSI value may be derived based on the available resources, the required resources to instantiate and run each type of NSI based on service catalog specifications, submitted demand bids including desired type of NSI, maximum willingness to pay, the AP location of customer, the cost of running each type of NSI (e.g., electricity cost, operational expense costs, etc.) In considering the foregoing, the service provider may determine an equilibrium value for each type of NSI at each AP location and then instantiate or de-allocate the VMs at different cloud locations. In this manner, the service provider may be able to maximize the total value for each network slice instance while at the same time ensuring that the value of each network slice instance is greater that the cost to provide it. For the purposes of this disclosure and the appended claims, the term equilibrium value will be used to designate the minimum acceptance price per the NSI per the time period in a particular location, regardless of how the equilibrium value is calculated. This means that the bid price must meet or exceed the equilibrium value for the requested NSI to be provided to the customer.

Operating Environment. The system and method provided herein allows for the provision of network slice instances that meet the requirements of a customer in an auction environment. Network slicing is an end-to-end concept where the user or operator of a network slice views the network slice as a separate logical network having similar properties of a dedicated network (e.g. separate management and optimization), but in fact is realized using a common infrastructure (processing, transport, radio) which is shared with other network slices. Physical network resources are separated from the logical network using the principles of Network Function Virtualization (NFV) and Software Defined Networking (SDN).

With reference to FIG. 1, there is shown a system 10 having three types of topology-based NSIs. The radio access network, known as NG-RAN in 5G terminology, comprises a set of radio base stations connected to the 5G core network and to each other. The NG-RAN often includes a centralized unit (CU) 18, distributed units (DU) 15 and a radio receiver unit (RU) 11 which may be deployed in various configurations depending on the various needs of customers. A single base station may be in communication with and provide service to multiple RUs 11. The topology based NSIs may be partitioned along virtual network functions with the partitions being an access cloud (AC) topology 12, edge cloud (EC) topology 16 and core cloud (CC) topology 20. Within each type of topology, there may be associated functionality. For example, the access cloud topology 12 may include the RU functionality 11, fronthaul transport 13, DU functionality 16 and an access Evolved Packet Core (EPC) functionality 14. This topology may provide customers some or all of the NSI functionality required and thus may be designated as an NSI specification.

Other customers may need additional NSI functionality and use the AV topology 12 as a front end to the edge cloud topology 16. The edge cloud topology 16 may include mid-haul transport 17, CU functions 18, and edge-based access to EPC functionality 19. Finally, other customers may specify an NSI core cloud topology 20 that may include access to the core network through backhaul transport 21 to the core EPC 22.

As such, customers may access EPC functions deployed at the access cloud 12, edge cloud 16 and/or the core cloud 20. Moreover, within each topology-based type of NSI (i.e., AC, EC, and CC), there may be different resource-based types of NSI, which may, for example, be classified as Large, XLarge, and 2Xlarge. For example, Large AC and XLarge AC NSIs may be differentiated based on the allocated resources in which the CPU cores to are allocated to different network functions or the allocated bandwidth between different transport links.

There is also shown an SDN controller 23 which may include separate control planes and data planes to set up and control the network virtualization functions. The SDN controller may include functionality to instantiate virtual network functions, allocate virtual network functions to particular network slices, balance the load across physical resources, and act as a network orchestrator. The SDN controller 23 may interface with the various functionalities performed by each network layer to coherently manage each network slice request. As such, the SDN controller 23 enables an efficient and flexible network slice creation that can be configured and reconfigured during its life-cycle. Operationally, the SDN controller 23 may control end-to-end service management which includes mapping of the various network slices instances expressed in terms of requirements with suitable network functions capable of satisfying the service constraints. The SDN controller 23 may provide for the virtualization of the physical network resources in order to simplify the resources management operations performed to allocate network functions. Finally, the SDN controller 23 may manage the life-cycle of the network slices, including performance monitoring to dynamically reconfigure each slice to accommodate possible SLA requirements modifications. It will be understood that while the SDN controller 23 is shown as a single component, the SDN controller 23 may be composed of multiple components and/or service orchestrators.

There is also shown an historical database 24 which may, for example, include one or more of historical pricing per NSI specification and performance criteria, equilibrium values, winning or losing bids as a function of location, time periods, maintenance, special events, emergencies and other factors which may affect access to and pricing of NSI assets. While shown as part of the network 10, it will be understood that the historical database 24 may be operated by or on behalf of a service provider or by or on behalf of a customer or by a third party or, alternatively the historical database 24 may be configured to be accessed by either a service provider, customer or third party.

Figure 2:
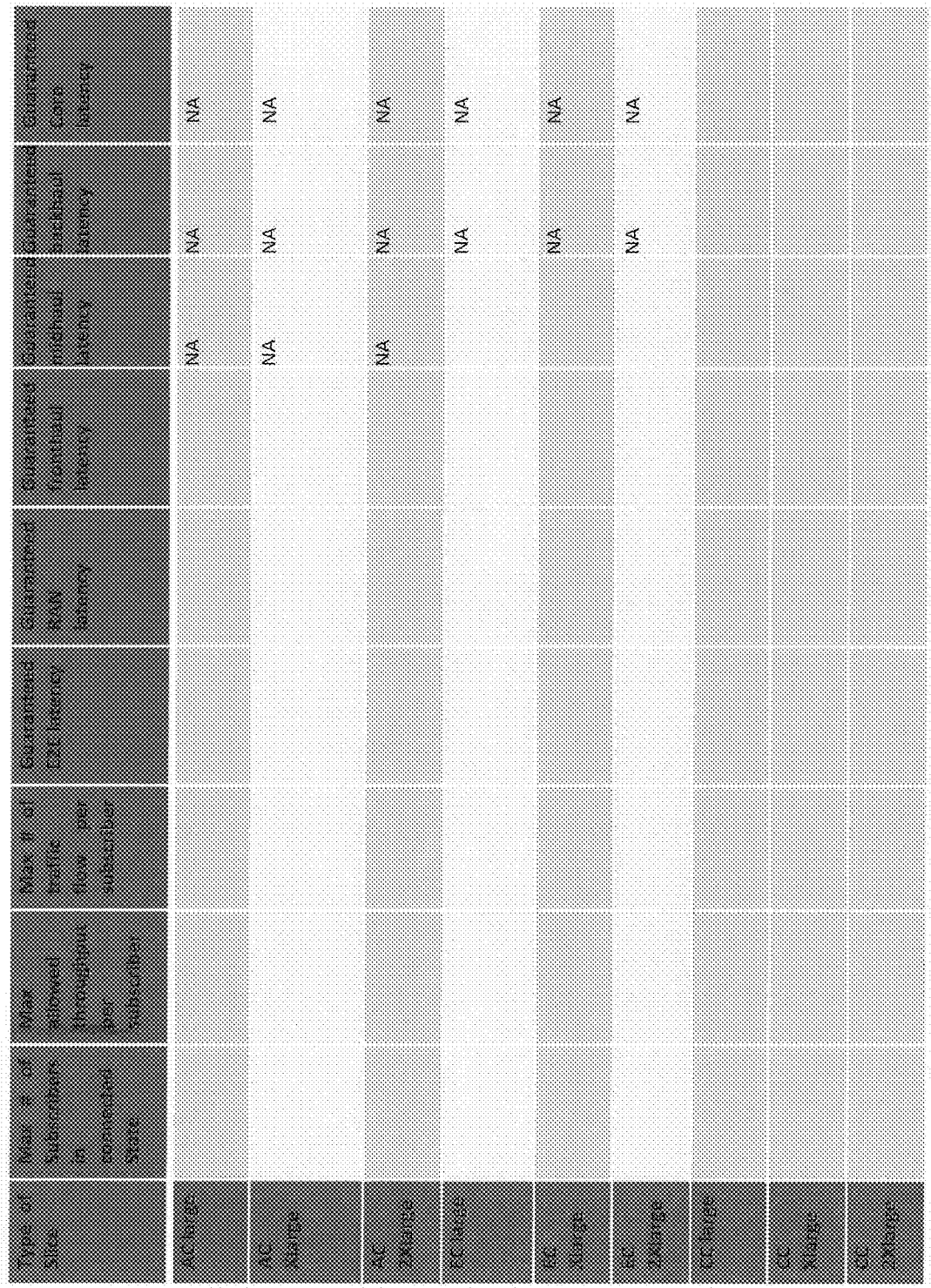
FIG. 2 illustrates an exemplary matrix of network slice types and associated performance requirements for those network slice types.

FIG. 2 is an exemplary matrix which may provide a catalog of network slices to be made available by a service provider to its customers. Along the left column is a set of network slice specifications, which may, for example, include a set of service level agreement (SLA) performance requirements. As an example only, those slices shown are AC Large, AC XLarge, AC 2XLarge, EC Large, EC XLarge, and EC 2Xlarge, CC Large, CC Xlarge, and CC 2Xlarge. Across the top of the matrix are the particular specifications that may be offered by the service provider. It will be understood that these categories are exemplary only and other categories of specifications may be possible and are included within the scope of the present disclosure and appended claims.

These specifications may include the maximum number of subscribers, the maximum throughput per subscriber, the maximum number of traffic flows per subscriber, guaranteed end-to-end latency, guaranteed RAN latency, and guaranteed latencies for each stage—front haul, mid-haul and back haul—as appropriate per the network slices. Note that some combinations are not available options, such as back haul latency for AC and EC network slices in view of the type of topology specified.

Figure 3:
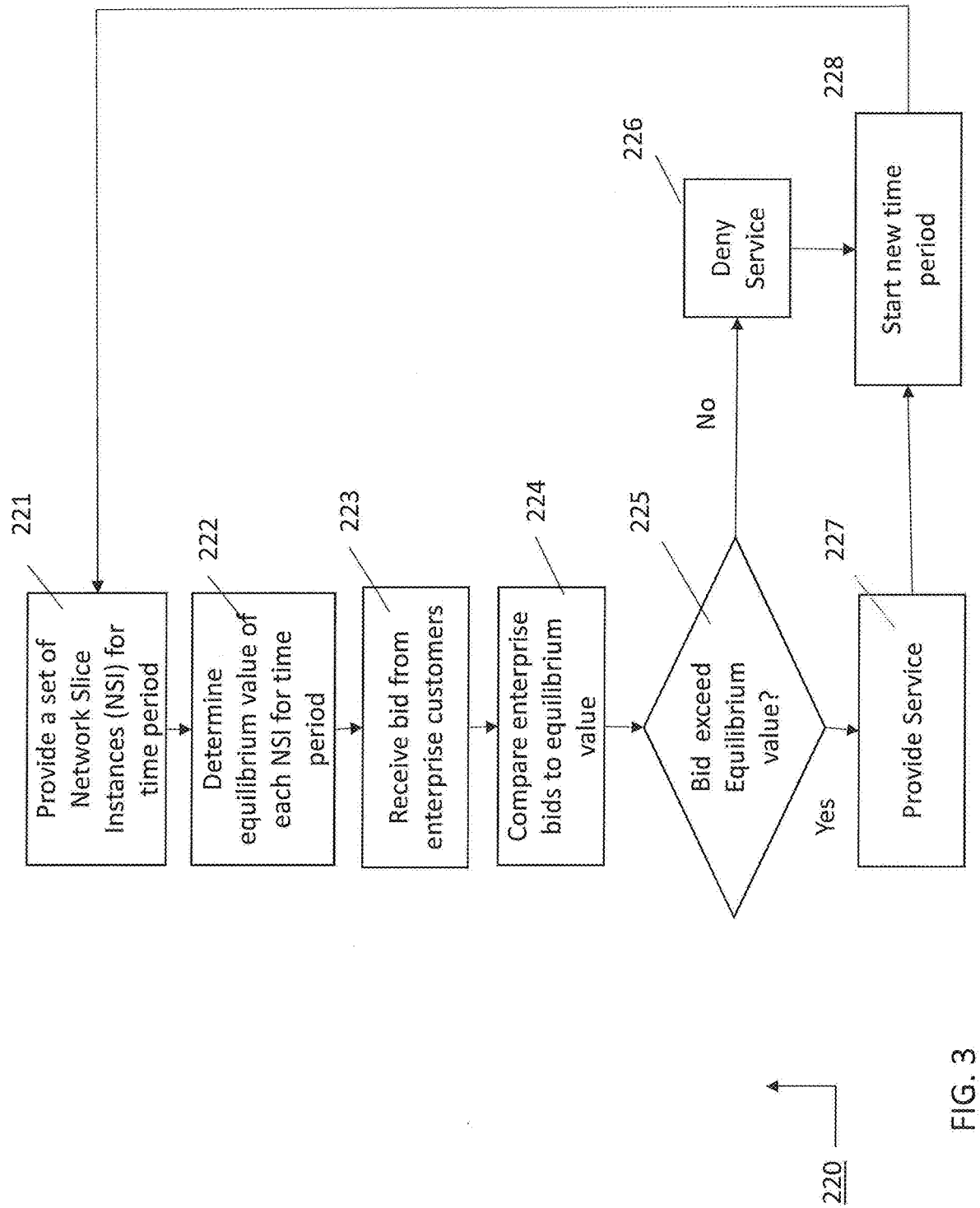
FIG. 3 illustrates an exemplary flow diagram of the specification and auction process from the network provider side in accordance with the present disclosure.

Methods of Use. With reference to FIG. 3, there is shown an exemplary method 220 from the perspective of a service provider. At 221, the set of network slice instances for the next time period are defined. These NSI specifications may, for example, be based on topology requirements and performance requirements. At 222, the equilibrium value for each NSI for the next time slot is determined. The equilibrium value may, for example, be the minimum cost for the service provider to supply the NSI during that time period. While the equilibrium value may be based on the cost of providing the NSI which may include the cost of electricity, capital equipment, and the like, it may be possible that other factors may affect the equilibrium value. For example, the equilibrium value may include market concepts such as supply and demand, location, historical bids, and the like. The equilibrium value may even be less than the cost of providing a network slice instance for a particular time period which may occur, for example, when a service provider is offering special deals to its customers or potential customers. At 223, the service provider may receive bids from one or more customers for one or more of the NSIs specified. At 224, the service provider may compare the customer bids with the equilibrium value. At 225, it is determined whether any of the individual bids exceed the equilibrium value. If any bids do exceed the equilibrium value, then service is provided at 227 for those customers whose bid did exceed the equilibrium value. If any of the bids do not exceed the equilibrium value, then service is denied at 226 for those customers whose bid did not exceed the equilibrium value. Regardless, a new time period may begin at 228 during which the auction/bid process may continue or restart as the case may be.

Figure 4:
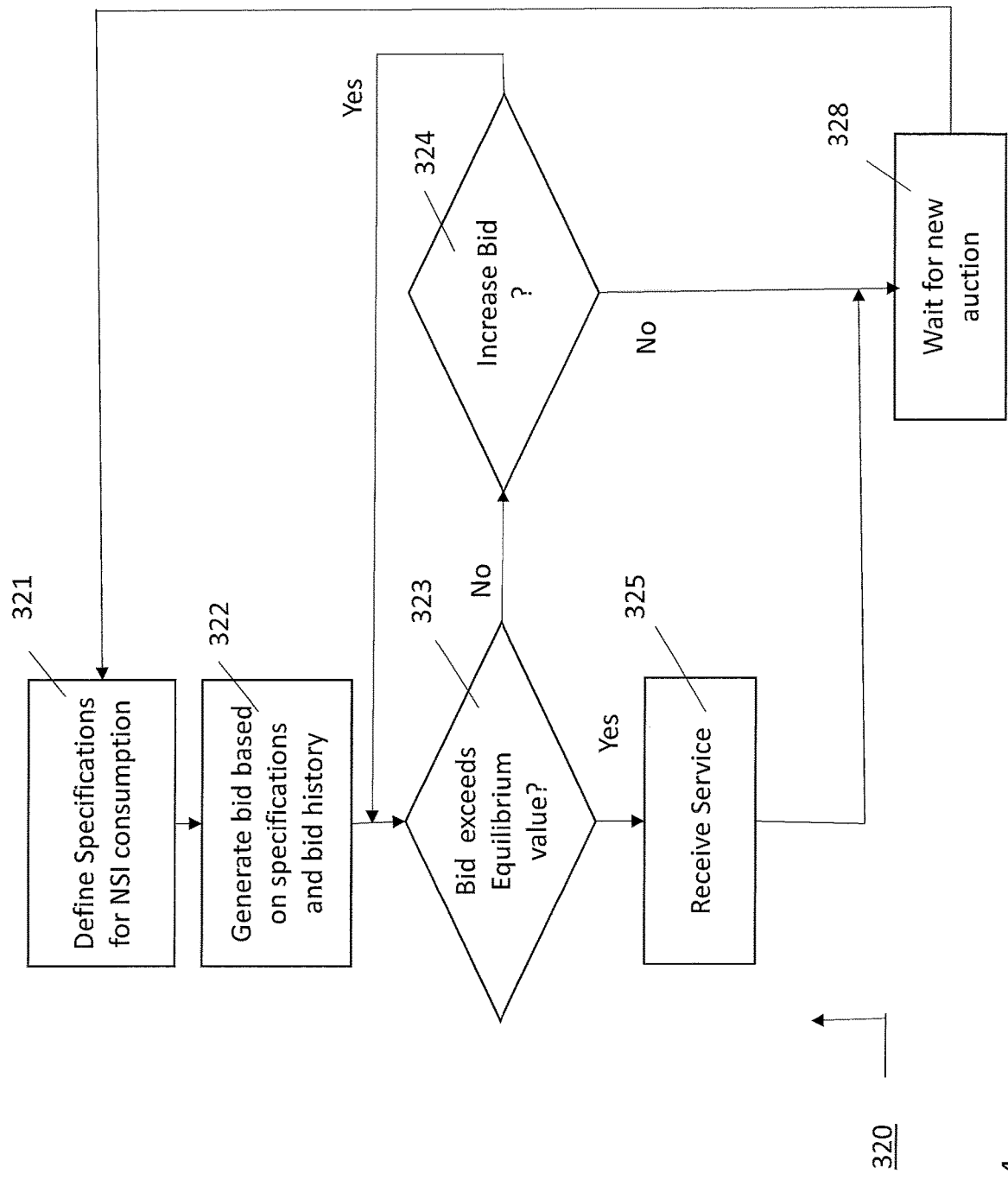
FIG. 4 illustrates an exemplary flow diagram of the specification and bid process from the customer side in accordance with the present disclosure.

With reference to FIG. 4, there is shown an exemplary flow diagram 320 from the perspective of the customer. At 321, the customer defines the specifications it desires for NSI consumption. At 322, the customer may generate a bid based on its specifications and the bid history. The bid history may include equilibrium values or winning bids and may be available in an historical database maintained by either the service provider or by the customer. At 323, it is determined whether the customer's bid exceeds the equilibrium value. If so, service is received by the customer at 325. If at 323 it is determined that the bid did not exceed the equilibrium value, the customer is given the option to increase its bid at 324. If so, the process continues at 323 to determine if the new bid exceeds the equilibrium value. If the customer decides not to increase its bid at 324, the customer may simply wait for a new auction at 328 at the beginning of the new time period.

Whenever a bid exceeds the equilibrium value and the customer receives service, the price of the service may match the bid, may match the equilibrium value, or may fall somewhere in between the two. For example, the customer may have a service contract with the service provider that includes a set price, volume discounts or some other pricing arrangements that sets the price somewhere between the equilibrium value and the bid value. In an aspect, the service contract may specify the bid price of the customer as the maximum price the customer will ever pay for a particular time slot and a particular NSI.

In an aspect, there may be bid optimization processes which calculate the expected equilibrium value and generate bids accordingly. For example, the bid optimization process may determine based on trial and error method what the equilibrium value may be for a given location, a given NSI specification and a given time slot and maintain a historical record of such equilibrium values. The bid optimization process may determine what other customers were paying for similar NSIs based on similar specifications during a similar time period. For example, there may be an historical record of the equilibrium value for a specific NSI type and associated performance requirements for a particular Thursday afternoon and the bid optimization process may consider whether the time period at issue, for example, a Wednesday afternoon or other Thursday afternoons in future weeks are similar to that Thursday afternoon in terms of pricing. The bid optimization process may include an algorithm that successively will bid from low to high for each time period until service is provided. In an aspect, the customer may place bids with two or more service providers in the hope of achieving the lower of two equilibrium values for any given time period.

In an aspect, the bid optimization process may include a machine learning algorithm. Such a machine learning algorithm may be implemented on either the customer side or the service provider side. For example, a customer may implement a machine learning algorithm such as predictive linear regression analysis to predict the equilibrium value and to generate bids accordingly. Use of such an algorithm may predict a present or future equilibrium value based on changes in input variables, such as the time of day, location, and/or increased or decreased demand caused by special events or emergencies. The algorithm may also generate a bid based on the predicted equilibrium value and automatically increase the bid if the bid does not initially exceed the equilibrium value. Moreover, the algorithm may consider overall budget and reduce the NSI specification in order to generate a more cost conservative bid if the predicted equilibrium value is deemed too high for a given time period in light of the anticipated usage and urgency of that usage. For example, if the predicted equilibrium value is deemed to be too high, the algorithm may relax the latency requirements in the network slice to allow for the services to be provisioned on physical assets at a different locale which may have a cheaper equilibrium value for that time period and therefore a lower bid price may be accepted.

On the service provider side, the machine learning algorithm may determine that the best way to maximize revenue is to lower the equilibrium value in certain time periods and focus not on the individual profit of an NSI for a particular time period, but rather on the aggregate revenue and determine equilibrium values accordingly. As such, the auction/bid process may thus create a dynamic marketplace implemented on specially programmed computer servers that advance the state of the art in network technology.

The auction/bid process may enable the market to determine the appropriate pricing for any NSI specification for any locale and for any time period by ensuring that the service provider is not losing money, either on individual network slice instances or in the aggregate, while at the same time ensuring that the customers are not overpaying for service.

In an aspect, an aggregator may participate in both the purchasing side of the auction and the selling side of an auction. For example, an aggregator may have service contracts with one or more service providers and resell NSIs to its own customers. The aggregator may wait for individual bids from its customers and then bid for service from the service providers or may choose to proactively purchase NSIs from the service providers and set its own equilibrium value based on that purchase price and its anticipated profit margin.

In view of the foregoing, this disclosure provides a practical application that builds a centralized system to provide for the specification, provisioning, and pricing of network slice instances based on specifications of the customer. There is an equilibrium value set by the service providers which is the minimum price that service will be provided to customers, while the bid process provides the possible upside of increased margins should the market demand manifest itself in higher bids. At the same time, the disclosure provides protection for customers by ensuring that the customers will not be surprised by service costs and are able to purchase services based only what they need for a given time period. The practical application includes generating a dynamic market for the provision of network slice instances and removes a barrier to offering network slice as a service to network customers. As such, the disclosure provides a new and novel method for offering and pricing of a new service offering that advances the state of the telecommunications industry.

While the disclosure has been described in relation to a generic network, it will be understood that the systems and methods disclosed herein may be deployed in both edge and central clouds to support current and future 5G real time use cases. Moreover, the architecture may also be used by carrier or third-party vendors.

Figure 5:
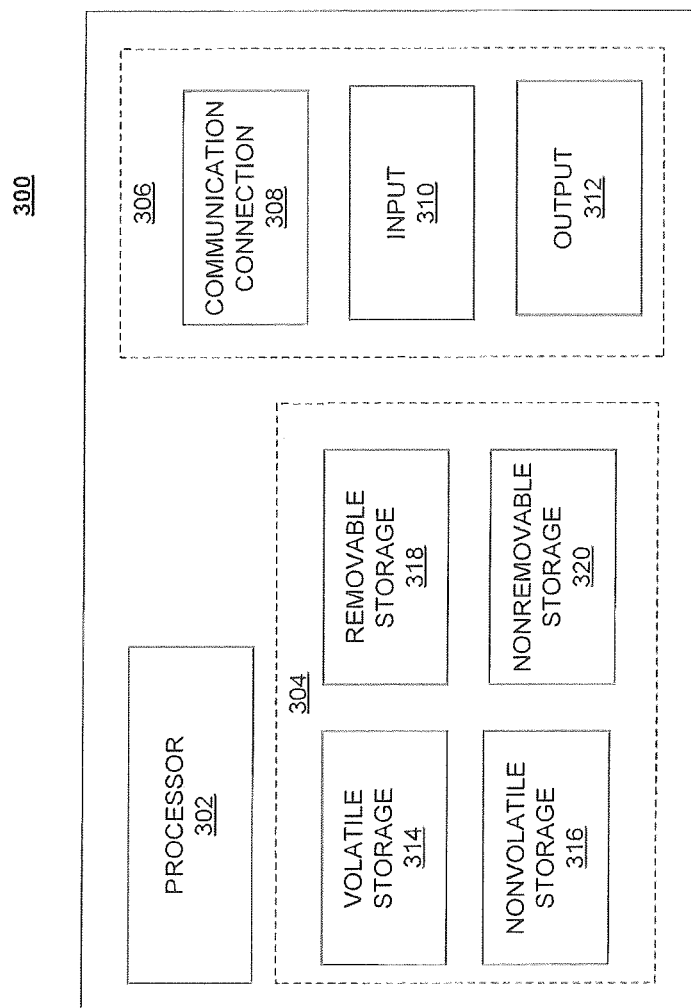
FIG. 5 illustrates a schematic of an exemplary network device.

Network Description. FIG. 5 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
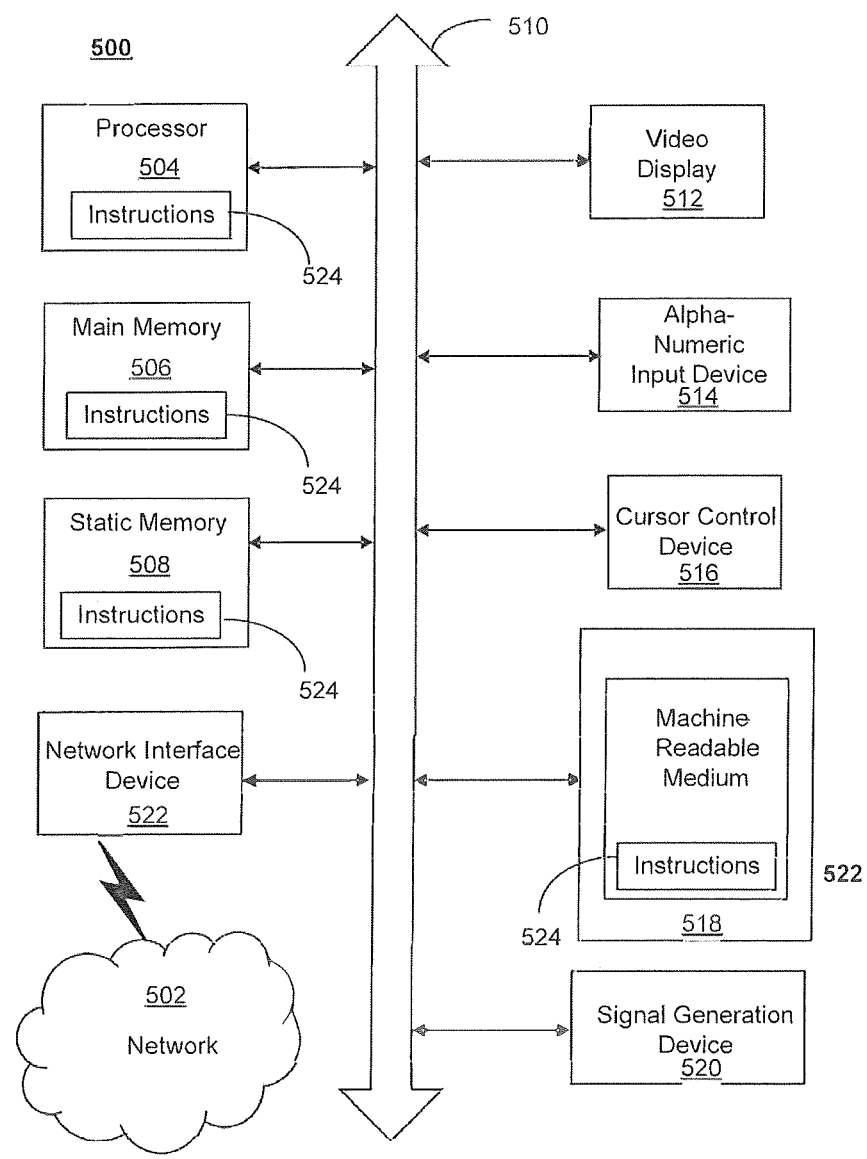
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
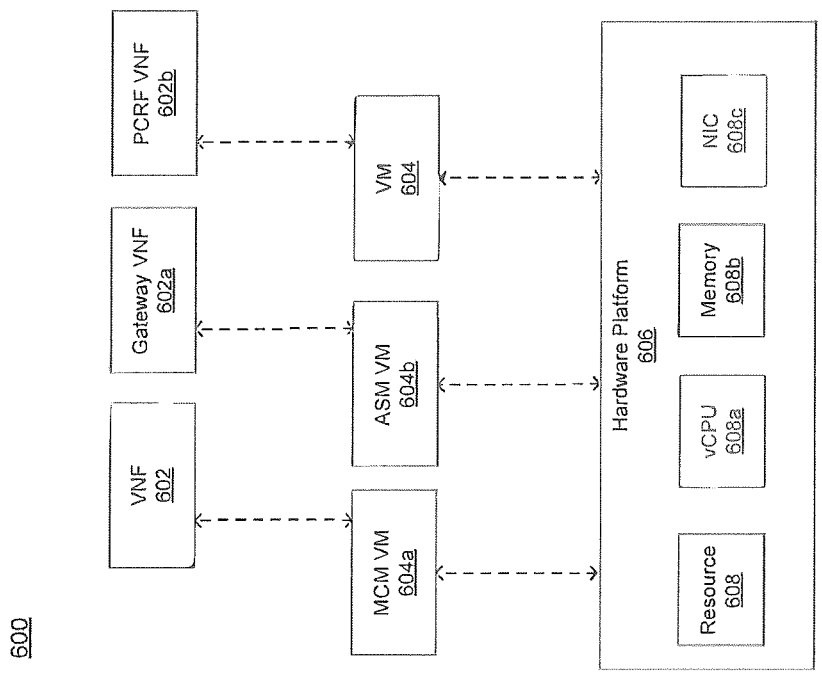
FIG. 7 is a representation of an exemplary network.

FIG. 7 is a representation of an exemplary network 600. Network 600 (e.g., network 111) may comprise an SDN— that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7 illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7 illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 8:
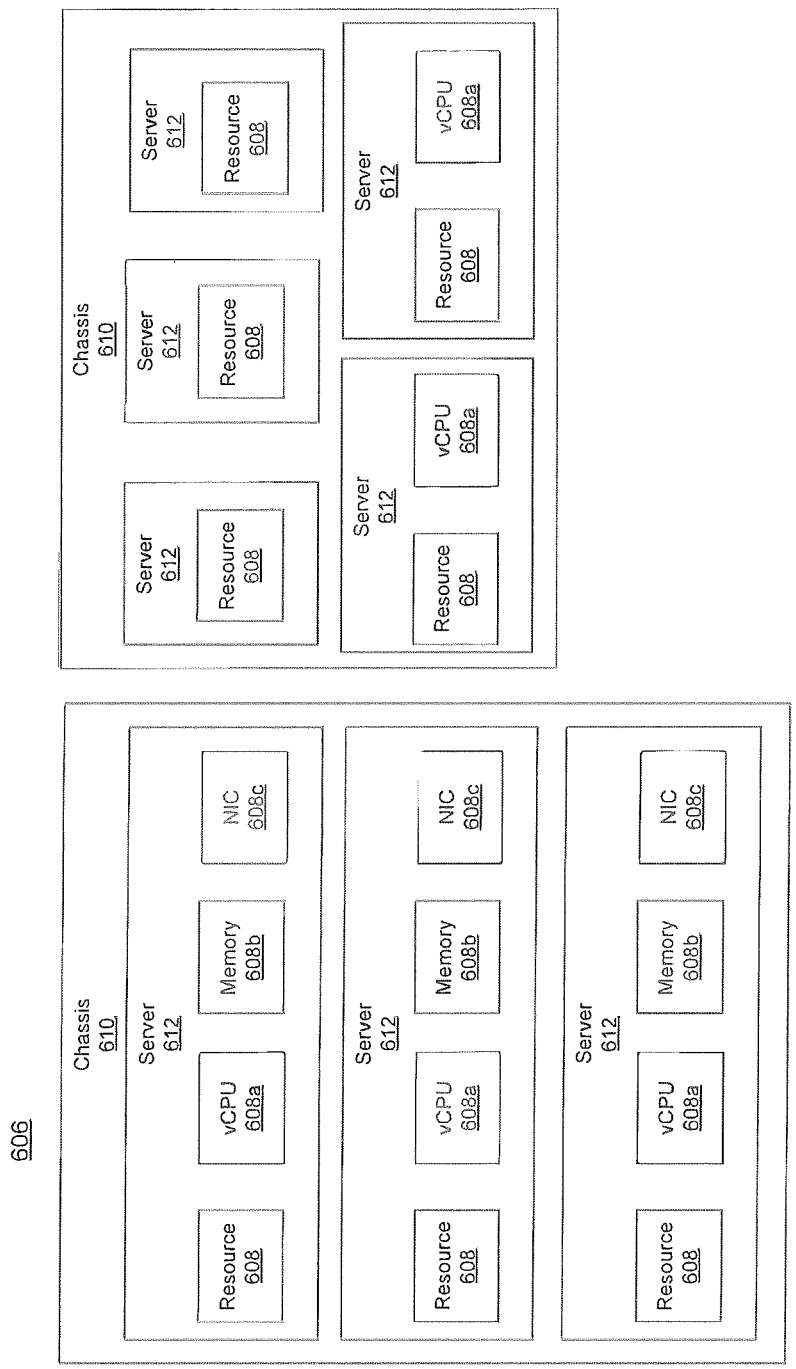
FIG. 8 is a representation of an exemplary hardware platform for a network.

While FIG. 7 illustrates resources 608 as collectively contained in hardware platform 606, the configuration of hardware platform 606 may isolate, for example, certain memory 608*c* from other memory 608*c*. FIG. 8 provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 8 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604*a*, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a software defined network controller;
   a software defined network managed by the software defined network controller, wherein the software defined network has a first virtual network function (VNF) topology, a second VNF topology and a third VNF topology, wherein each of the first VNF topology, the second VNF topology and the third VNF topology has a set of performance requirements associated therewith, and wherein the first VNF topology comprises an access cloud architecture and includes a software defined network radio receiving unit in communication with a base station, a software defined network access evolved packet core (EPC), and a first transport layer between the software defined network radio receiving unit and the software defined network access EPC;
   an input-output interface;
   a processor coupled to the input-output interface, wherein the processor is further coupled to a memory, and wherein the memory has stored thereon executable instructions that when executed by the processor cause the processor to effectuate operations comprising:
   defining a network slice specification using at least one of the first VNF topology, the second VNF topology or the third VNF topology, and the associated performance requirements;
   determining a first equilibrium value for a network slice configured in accordance with the network slice specification;
   receiving a first bid price for the network slice;
   comparing the first bid price to the first equilibrium value; and
   based on the comparing, providing service using the network slice in accordance with the network slice specification.

2. The system of claim 1, wherein the second VNF topology comprises an edge cloud architecture and includes an edge software defined network EPC and there is a second transport layer between the first VNF topology and the second VNF topology.

3. The system of claim 2, wherein the third VNF topology comprises a core cloud architecture and includes a core software defined network EPC and there is a third transport layer between the second VNF topology and the third VNF topology.

4. The system of claim 1, wherein the operations further comprise:
   determining a second equilibrium value for another time period for the network slice;
   receiving a second bid price for the another time period for the network slice;
   comparing the second equilibrium value and the second bid price; and
   providing the network slice to a customer if the second bid price meets or exceeds the second equilibrium value.

5. The system of claim 4, further comprising an historical database accessible by the customer, wherein the first bid price is calculated using data from the historical database.

6. The system of claim 5, wherein the first bid price is calculated using a machine learning algorithm.

7. The system of claim 6, wherein the machine learning algorithm comprises linear regression analysis.

8. The system of claim 5, wherein the historical database comprises winning or losing bids as a function of location.

9. A system comprising:
   a software defined network controller;
   a software defined network managed by the software defined network controller, wherein the software defined network has a first virtual network function (VNF) topology comprising an access cloud architecture, a second VNF topology comprising an edge cloud architecture and a third VNF topology comprising a core cloud architecture, wherein each of the first VNF topology, the second VNF topology and the third VNF topology has a set of performance requirements associated therewith, and wherein the first VNF topology includes a software defined network radio receiving unit in communication with a base station, a software defined network access evolved packet core (EPC), and a transport layer between the software defined network radio receiving unit and the software defined network access EPC;
   an input-output interface;
   a processor coupled to the input-output interface, wherein the processor is further coupled to a memory, and wherein the memory has stored thereon executable instructions that when executed by the processor cause the processor to effectuate operations comprising:

defining a network slice specification using at least one of the first VNF topology, the second VNF topology or the third VNF topology, and the associated performance requirements;

determining a first equilibrium value for a network slice configured in accordance with the network slice specification, wherein the determining the first equilibrium value is based at least in part upon a cost of electricity to provide the network slice configured in accordance with the network slice specification;

comparing a first bid price for the network slice to the first equilibrium value; and based on the comparing, providing service using the network slice in accordance with the network slice specification.

10. The system of claim 9, wherein the second VNF topology includes an edge software defined network EPC, and wherein there is another transport layer between the first VNF topology and the second VNF topology.

11. The system of claim 9, wherein the third VNF topology includes a core software defined network EPC, and wherein there is another transport layer between the second VNF topology and the third VNF topology.

12. The system of claim 9, wherein the operations further comprise:

determining a second equilibrium value for another time period for the network slice;

comparing the second equilibrium value and a second bid price for the another time period for the network slice; and providing the network slice to a customer if the second bid price meets or exceeds the second equilibrium value.

13. The system of claim 9, further comprising an historical database accessible by a customer, wherein the first bid price is calculated using data from the historical database.

14. The system of claim 13, wherein the first bid price is calculated using a machine learning algorithm.

15. The system of claim 14, wherein the machine learning algorithm comprises linear regression analysis.

16. A system comprising:

a software defined network controller;

a software defined network managed by the software defined network controller, wherein the software defined network has a first virtual network function (VNF) topology comprising an access cloud architecture, a second VNF topology comprising an edge cloud architecture and a third VNF topology comprising a core cloud architecture, wherein each of the first VNF topology, the second VNF topology and the third VNF topology has a set of performance requirements associated therewith, wherein the first VNF topology includes a software defined network radio receiving unit in communication with a base station, a software defined network access evolved packet core (EPC), and a first transport layer between the software defined network radio receiving unit and the software defined network access EPC, wherein the second VNF topology includes an edge software defined network EPC, wherein there is a second transport layer between the first VNF topology and the second VNF topology, wherein the third VNF topology includes a core software defined network EPC, and wherein there is a third transport layer between the second VNF topology and the third VNF topology;

an input-output interface;

a processor coupled to the input-output interface, wherein the processor is further coupled to a memory, and wherein the memory has stored thereon executable instructions that when executed by the processor cause the processor to effectuate operations comprising:

determining a first equilibrium value for a network slice configured in accordance with a network slice specification, wherein the network slice specification is defined using at least one of the first VNF topology, the second VNF topology or the third VNF topology, and the associated performance requirements, and wherein the determining the first equilibrium value is based at least in part upon a cost of capital equipment to provide the network slice configured in accordance with the network slice specification;

receiving a first bid price for the network slice;

comparing the first bid price to the first equilibrium value; and based on the comparing, providing service using the network slice in accordance with the network slice specification.

17. The system of claim 16, wherein the operations further comprise:

determining a second equilibrium value for a another time period for the network slice;

comparing the second equilibrium value and a second bid price for the another time period for the network slice; and providing the network slice to a customer if the second bid price meets or exceeds the second equilibrium value.

18. The system of claim 17, further comprising an historical database accessible by the customer, wherein the first bid price is calculated using data from the historical database.

19. The system of claim 16, wherein the first bid price is calculated using a machine learning algorithm.

20. The system of claim 19, wherein the machine learning algorithm comprises linear regression analysis.

* * * * *